United States Patent
Lee et al.

(10) Patent No.: US 9,083,990 B2
(45) Date of Patent: Jul. 14, 2015

(54) ELECTRONIC DEVICE AND METHOD FOR MANAGING VIDEO SNAPSHOT

(71) Applicant: Zhongshan Innocloud Intellectual Property Services Co., Ltd., Zhongshan (CN)

(72) Inventors: Chung-I Lee, New Taipei (TW); Yi-Wen Cai, New Taipei (TW); Ming-Hua Tang, New Taipei (TW)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 0 days.

(21) Appl. No.: 14/260,276

(22) Filed: Apr. 23, 2014

(65) Prior Publication Data

US 2014/0325581 A1    Oct. 30, 2014

(30) Foreign Application Priority Data

Apr. 26, 2013    (TW) .............................. 102115174 A

(51) Int. Cl.
*H04N 5/445* (2011.01)
*H04N 21/2343* (2011.01)
*H04N 21/4402* (2011.01)
*H04N 21/4722* (2011.01)
*H04N 21/81* (2011.01)

(52) U.S. Cl.
CPC ............... *H04N 21/234327* (2013.01); *H04N 21/440236* (2013.01); *H04N 21/4722* (2013.01); *H04N 21/8153* (2013.01)

(58) Field of Classification Search
CPC ............... H04N 21/234336; H04N 21/440236
See application file for complete search history.

(56) References Cited

U.S. PATENT DOCUMENTS

| | | | |
|---|---|---|---|
| 6,172,672 B1 * | 1/2001 | Ramasubramanian et al. | 715/720 |
| 6,295,086 B1 * | 9/2001 | Fukushima et al. | 348/231.1 |
| 8,473,994 B2 * | 6/2013 | Blackburn et al. | 725/110 |
| 2002/0116473 A1 * | 8/2002 | Gemmell | 709/219 |
| 2003/0009773 A1 * | 1/2003 | Carlson | 725/142 |
| 2003/0232593 A1 * | 12/2003 | Wahlroos et al. | 455/3.05 |
| 2004/0066457 A1 * | 4/2004 | Silverstein et al. | 348/211.3 |
| 2006/0010222 A1 * | 1/2006 | Cleron et al. | 709/206 |
| 2006/0037050 A1 * | 2/2006 | Bae et al. | 725/62 |
| 2009/0245747 A1 * | 10/2009 | Beyabani | 386/46 |
| 2010/0131998 A1 * | 5/2010 | Yu | 725/110 |

* cited by examiner

*Primary Examiner* — Junior Mendoza
(74) *Attorney, Agent, or Firm* — Novak Druce Connolly Bove + Quigg LLP

(57) ABSTRACT

Method of managing video snapshot of receiving bitstreams of a video and bitstream parameters of the received bitstreams from a server through a network channel. The electronic device is connected to the server. The server encodes the video into an encoded file using an encoder of the server. The encoded file comprises a plurality of bitstreams. The plurality of bitstreams in the encoded file comprising a plurality of enhancement layers. According to a selection of a user of the electronic device, a snapshot grade is determined. According to the received bitstreams and the determined snapshot grade, additional enhancement layers which are not comprised in the received bitstreams are acquired from the encoded file in the server through the network channel. Based on the acquired additional enhancement layers, a video snapshot is generated.

15 Claims, 3 Drawing Sheets

ELECTRONIC DEVICE AND METHOD FOR MANAGING VIDEO SNAPSHOT

FIELD

Embodiments of the present disclosure relate to video processing technology, and particularly to an electronic device and a method for managing video snapshot.

BACKGROUND

While a user is watching a video using video streaming via network, if the user is interested in an image of the video or a part of the video, the user downloads the video in a storage device. Then the user captures the image or the part of the video from the stored video. If the network is poor, the video cannot be downloaded fast, and the quality of the video may be influenced, therefore, quality of a snapshot of the video is also influenced. Thus, the user cannot acquire a satisfied video snapshot. In addition, if the video is not downloaded completely as some segments in the video may be missed, the user cannot obtain a snapshot of the missed segments. And the user may not be given a choice to watch the video in different quality or resolution. Therefore there is room for improvement in the art.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable storage medium or other computer storage device.

Figure 1:
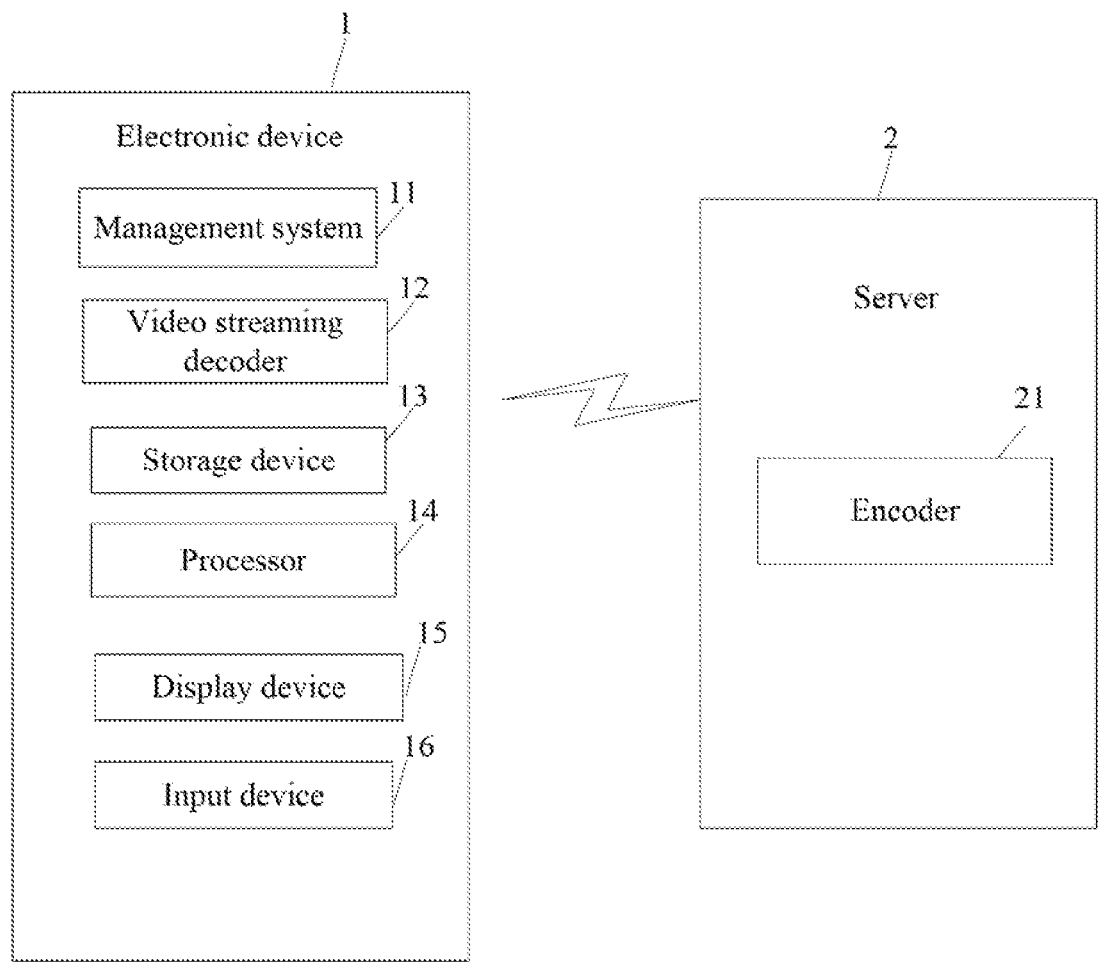
FIG. 1 is a block diagram of one embodiment of an electronic device including a management system.

FIG. 1 is a block diagram of one embodiment of an electronic device 1 including a management system 11 (hereinafter "the system 11"). The electronic device 1 further includes a video streaming decoder 12, a storage device 13, at least one processor 14, a display device 15, and an input device 16. The electronic device 1 may be a computer, a smart phone, a personal digital assistant (PDA), or other suitable electronic device. FIG. 1 illustrates only one example of the electronic device 1 and can include more or fewer components than illustrated, or have a different configurations of the various components in other embodiments.

The electronic device 1 is connected to a server 2 by a network. The server 2 includes an encoder 21. The encoder 21 may be a video streaming encoder. The encoder 21 can be utilized to encode a video into an encoded file using a High Efficiency Video Coding standard or Scalable Video Coding standard. The video may be a video file which is stored in the server 2, or a real-time video file captured by cameras. The encoded file includes a plurality of bitstreams. The bitstreams in the encoded file can include a base layer and a plurality of enhancement layers.

The base layer includes basis data of the video. In some embodiments, when the network is poor, the electronic device 1 can only receive the base layer and cannot receive the enhancement layers in the encoded file from the server 2. Therefore, when the base layer is decoded using the video streaming decoder 12 into a decoded file, the decoded file has a slow frame rate and a low resolution. The enhancement layers in the encoded file are encoded based on the base layer. The enhancement layers can improve the frame rate and the low resolution of the decoded file. Each of the enhancement layers in the encoded file corresponds to an enhancement layer number. For example, there are four enhancement layers in the encoded file, such as a first enhancement layer, a second enhancement layer, a third enhancement layer and a fourth enhancement layer. For example, the fourth enhancement layer corresponds to an enhancement layer number of 4, the third enhancement layer corresponds to an enhancement layer number of 3, and so on. Each of enhancement layers in the encoded file also corresponds to a frame rate and a resolution. A greater enhancement layer number represents that a corresponding enhancement layer has a higher frame rate and a higher resolution.

The system 11 can acquire more enhancement layers from the encoded file in the server 2 for a user, and generates a snapshot with a quality better than the encoded file based on the acquired enhancement layers.

In one embodiment, the storage device 13 may include various types of non-transitory computer-readable storage medium, such as a hard disk, a compact disc, a digital video disc, or a tape drive. The display device 15 may display images and videos, and the input device 16 may be a mouse or a keyboard to input computer-readable data.

Figure 2:
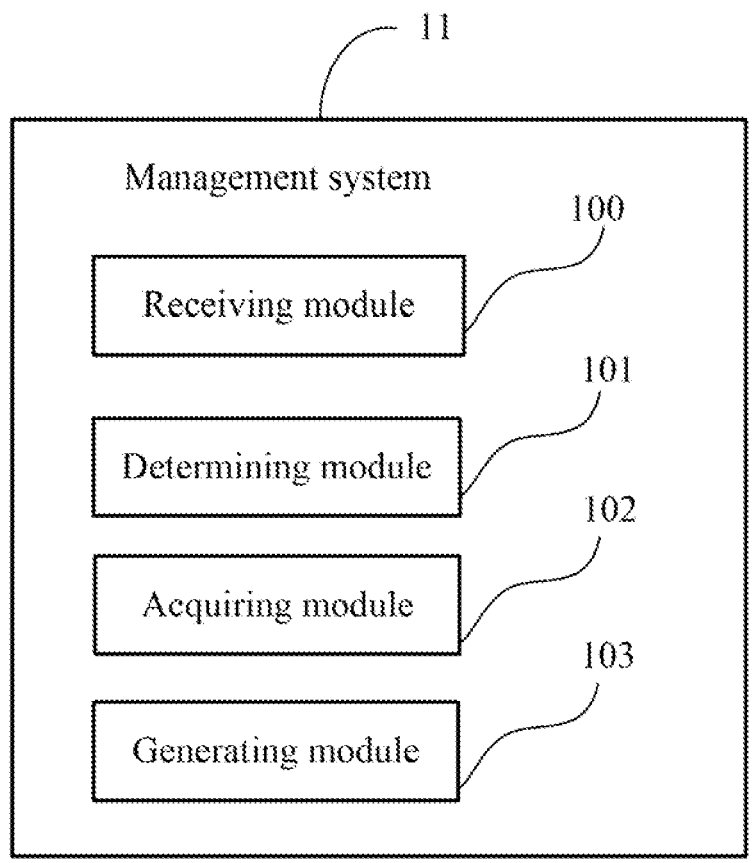
FIG. 2 is a block diagram of one embodiment of function modules of the management system in the electronic device of FIG. 1.

FIG. 2 is a block diagram of one embodiment of function modules of the system 11. In at least one embodiment, the system 11 may include a receiving module 100, a determining module 101, an acquiring module 102, and a generating module 103. The function modules 100-103 may include computerized codes in the form of one or more programs, which are stored in the storage device 13. The at least one processor 14 executes the computerized codes to provide functions of the function modules 100-103. A detailed description of the function modules 100-103 is given in reference to FIG. 3.

Figure 3:
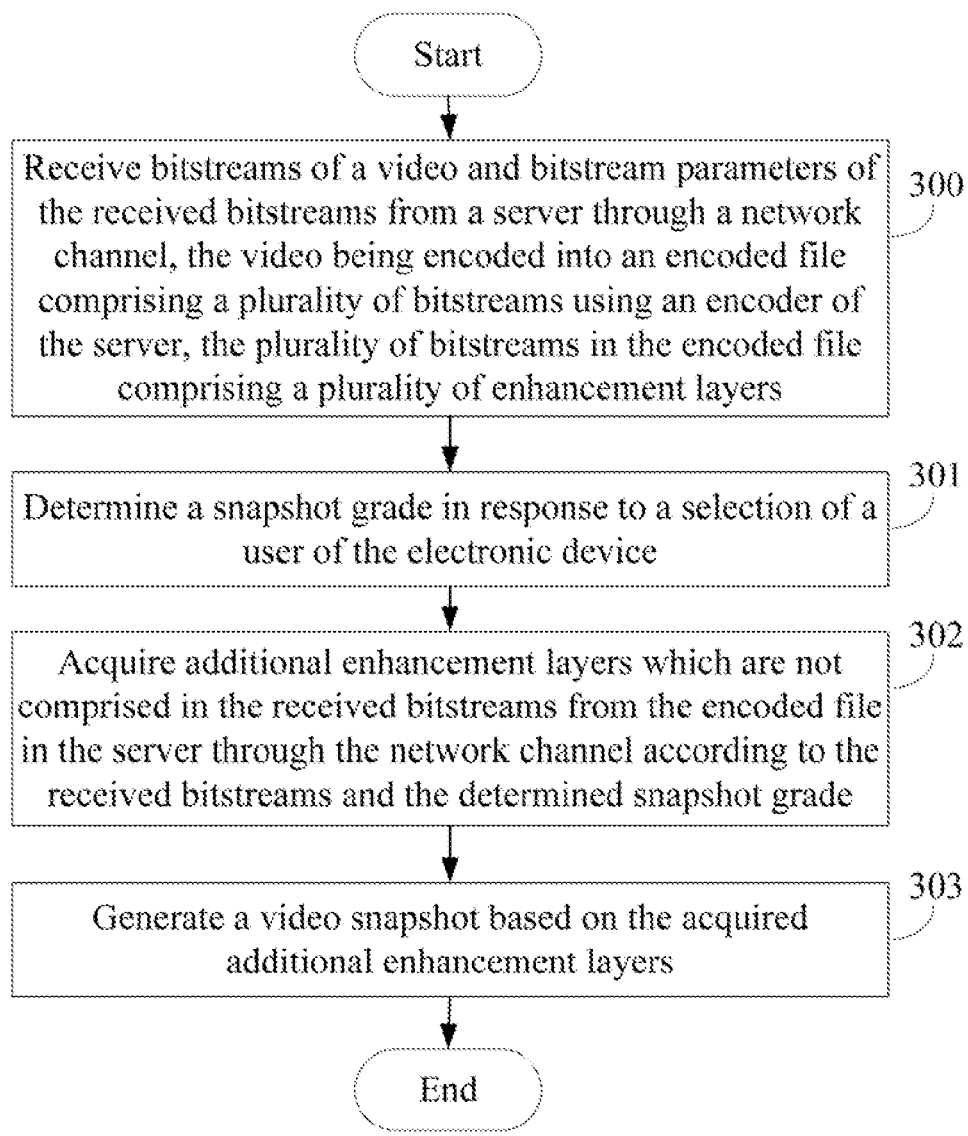
FIG. 3 illustrates a flowchart of one embodiment of a method for managing video snapshot in the electronic device of FIG. 1.

FIG. 3 illustrates a flowchart of one embodiment of a method for managing video snapshot in the electronic device 1 of FIG. 1. Depending on the embodiment, additional steps may be added, others removed, and the ordering of the steps may be changed.

In 300, the encoder 21 encodes a video into an encoded file using a High Efficiency Video Coding standard or Scalable Video Coding standard. The encoded file includes a plurality of bitstreams. The plurality of bitstreams in the encoded file includes a base layer and a plurality of enhancement layers. The server 2 sends bitstreams and bitstream parameters of the bitstreams to the electronic device 1 through a network channel. The receiving module 100 receives bitstreams of the video and the bitstream parameters of the received bitstreams from the server 2 through a network channel. The received bitstreams in the electronic device 1 may be some of the bitstreams included in the encoded file. Therefore, the received bitstreams may not include enhancement layers. The bitstream parameters may be a video parameter set of a High Efficiency Video Coding standard. The bitstream parameters may include enhancement layer numbers of enhancement layers included in the received bitstreams. The video streaming decoder 12 decodes the received bitstreams based on the received bitstream parameters.

The network channel may be a first channel or a second channel. In some embodiments, the first channel is based on the User Datagram Protocol, and the second channel is based on the Transmission Control Protocol. The first channel has an unreliable protocol, but has a high communication rate. When quality of the network is bad, data may be lost using the first channel. The second channel has a reliable protocol. Although quality of the network is bad, data lost can be avoided using the second channel.

In 301, the determining module 101 determines a snapshot grade in response to a selection of the user of the electronic device 1. Each of the enhancement layers in the encoded file corresponds to a snapshot grade. Therefore, snapshot grades can be displayed on the display device 15 for the user to select. Each snapshot grade includes a frame rate and a resolution. For example, a first snapshot grade has a frame rate of 10 and a resolution of 240×360, a second snapshot grade has a frame rate of 15 and a resolution of 540×720, and a second snapshot grade has a frame rate of 20 and a resolution of 720×1024. The first snapshot grade corresponds to an enhancement layer number of 1, the second snapshot grade corresponds to an enhancement layer number of 2, and the third snapshot grade corresponds to an enhancement layer number of 3.

In 302, the acquiring module 102 acquires additional enhancement layers from the encoded file in the server 2 through the network channel according to the received bitstreams, the received bitstream parameters and the determined snapshot grade. The additional enhancement layers are not included in the received bitstreams. In some embodiments, the network channel is the second channel to ensure the electronic device 1 acquires the additional enhancement layers successfully.

In detail, the acquiring module 102 obtains a first layer number from the server 2. The first layer number represents a maximum enhancement layer number of an enhancement layer among all of the enhancement layers in the encoded file. Then the acquiring module 102 obtains a second layer number from the received bitstream parameters. The second layer number represents a maximum enhancement layer number of an enhancement layer in the received bitstreams. It is determined that whether the second layer number is equal to the first layer number. When the second layer number is equal to the first layer number, the generating module 103 generates a video snapshot based on the received bitstreams.

When the second layer number is not equal to the first layer number, the acquiring module 102 determines whether a third layer number is more than the second layer number. The third layer number represents an enhancement layer number of an enhancement layer corresponding to the determined snapshot grade. When the third layer number is less than or equal to the second layer number, the generating module 103 generates a video snapshot based on the received bitstreams. When the third layer number is more than the second layer number, the acquiring module 102 acquires the additional enhancement layers from the encoded file in the server through the network channel according to the third layer number and correlativites of the plurality of enhancement layers in the encoded file.

Each of the enhancement layers in the encoded file has a plurality of frames. The frames has correlatives. Therefore, the enhancement layers in the encoded file have correlatives. For example, if a third layer number is 3, a second layer number is 1 and a first layer number is 4. The acquiring module 102 needs to acquire enhancement layers having enhancement layer numbers "2" and "3." That is, as the enhancement layer having the enhancement layer number "3" is related with the enhancement layer having the enhancement layer number "2."

In 303, the generating module 103 generates a video snapshot based on the acquired additional enhancement layers.

In some embodiments, the acquired additional enhancement layers are decoded in the electronic device 1 using the video streaming decoder 12 into a specified video file. The specified video file is displayed on the display device 15 for the user. The user can select an image or a segment of the video file. The generating module 103 generates a video snapshot based on the selected image or the part of the video file.

In other embodiments, when some parts of the received bitstreams are lost in the electronic device 2, the acquiring module 102 can acquire the received bitstreams from the encoded file in the server 2.

It should be emphasized that the above-described embodiments of the present disclosure, including any particular embodiments, are merely possible examples of implementations, set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

What is claimed is:

1. A computerized video snapshot management method being executed by at least one processor of an electronic device, the electronic device being connected to a server, the method comprising:

receiving bitstreams of a video and bitstream parameters of the received bitstreams from the server through a network channel, the video being encoded into an encoded file comprising a plurality of bitstreams using an encoder of the server, the plurality of bitstreams in the encoded file comprising a plurality of enhancement layers;

determining a snapshot grade in response to a selection of a user of the electronic device;

acquiring additional enhancement layers which are not in the received bitstreams from the encoded file in the server through the network channel according to the received bitstreams and the determined snapshot grade;

generating a video snapshot based on the acquired additional enhancement layers;

wherein each of the plurality of enhancement layers in the encoded file corresponds to an enhancement layer number, and the additional enhancement layers are acquired from the encoded file in the server by:

obtaining a first layer number from the server, the first layer number representing a maximum enhancement layer number of an enhancement layer among the plurality of enhancement layers in the encoded file;

obtaining a second layer number from the received bitstream parameters, the second layer number representing a maximum enhancement layer number of an enhancement layer in the received bitstreams;

determining whether the second layer number is equal to the first layer number;

determining whether a third layer number is more than the second layer number when the second layer number is not equal to the first layer number, the third layer number representing an enhancement layer number of an enhancement layer corresponding to the determined snapshot grade; and acquiring the additional enhancement layers from the encoded file in the server through the network channel when the third layer number is more than the second layer number, according to the third layer number.

2. The method according to claim 1, wherein the network channel is based on User Datagram Protocol or Transmission Control Protocol.

3. The method according to claim 1, wherein each of the plurality of enhancement layers in the encoded file corresponds to a snapshot grade.

4. The method according to claim 1, wherein each snapshot grade comprises a frame rate and a resolution.

5. The method according to claim 1, wherein the bitstream parameters comprise a video parameter set of a High Efficiency Video Coding standard.

6. An electronic device, comprising:

a processor; and a storage device that stores one or more programs, when executed by the at least one processor, cause the at least one processor to perform a video snapshot management method, the electronic device being connected to a server, the method comprising:

receiving bitstreams of a video and bitstream parameters of the received bitstreams from the server through a network channel, the video being encoded into an encoded file comprising a plurality of bitstreams using an encoder of the server, the plurality of bitstreams in the encoded file comprising a plurality of enhancement layers;

determining a snapshot grade in response to a selection of a user of the electronic device;

acquiring additional enhancement layers which are not in the received bitstreams from the encoded file in the server through the network channel according to the received bitstreams and the determined snapshot grade;

generating a video snapshot based on the acquired additional enhancement layers;

wherein each of the plurality of enhancement layers in the encoded file corresponds to an enhancement layer number, and the additional enhancement layers are acquired from the encoded file in the server by:

obtaining a first layer number from the server, the first layer number representing a maximum enhancement layer number of an enhancement layer among the plurality of enhancement layers in the encoded file;

obtaining a second layer number from the received bitstream parameters, the second layer number representing a maximum enhancement layer number of an enhancement layer in the received bitstreams;

determining whether the second layer number is equal to the first layer number;

determining whether a third layer number is more than the second layer number when the second layer number is not equal to the first layer number, the third layer number representing an enhancement layer number of an enhancement layer corresponding to the determined snapshot grade; and acquiring the additional enhancement layers from the encoded file in the server through the network channel when the third layer number is more than the second layer number, according to the third layer number.

7. The electronic device according to claim 6, wherein the network channel is based on User Datagram Protocol or Transmission Control Protocol.

8. The electronic device according to claim 6, wherein each of the plurality of enhancement layers in the encoded file corresponds to a snapshot grade.

9. The electronic device according to claim 6, wherein each snapshot grade comprises a frame rate and a resolution.

10. The electronic device according to claim 6, wherein the bitstream parameters comprise a video parameter set of a High Efficiency Video Coding standard.

11. A non-transitory storage medium having stored thereon instructions that, when executed by a processor of an electronic device, the electronic device being connected to a server, causes the processor to perform a video snapshot management method in the electronic device, wherein the method comprises:

receiving bitstreams of a video and bitstream parameters of the received bitstreams from the server through a network channel, the video being encoded into an encoded file comprising a plurality of bitstreams using an encoder of the server, the plurality of bitstreams in the encoded file comprising a plurality of enhancement layers;

determining a snapshot grade in response to a selection of a user of the electronic device;

acquiring additional enhancement layers which are not in the received bitstreams from the encoded file in the server through the network channel according to the received bitstreams and the determined snapshot grade;

generating a video snapshot based on the acquired additional enhancement layers;

wherein each of the plurality of enhancement layers in the encoded file corresponds to an enhancement layer number, and the additional enhancement layers are acquired from the encoded file in the server by:

obtaining a first layer number from the server, the first layer number representing a maximum enhancement layer number of an enhancement layer among the plurality of enhancement layers in the encoded file;

obtaining a second layer number from the received bitstream parameters, the second layer number representing a maximum enhancement layer number of an enhancement layer in the received bitstreams;

determining whether the second layer number is equal to the first layer number;

determining whether a third layer number is more than the second layer number when the second layer number is not equal to the first layer number, the third layer number representing an enhancement layer number of an enhancement layer corresponding to the determined snapshot grade; and acquiring the additional enhancement layers from the encoded file in the server through the network channel when the third layer number is more than the second layer number, according to the third layer number.

12. The non-transitory storage medium according to claim 11, wherein the network channel is based on User Datagram Protocol or Transmission Control Protocol.

13. The non-transitory storage medium according to claim 11, wherein each of the plurality of enhancement layers in the encoded file corresponds to a snapshot grade.

14. The non-transitory storage medium according to claim 11, wherein each snapshot grade comprises a frame rate and a resolution.

15. The non-transitory storage medium according to claim 11, wherein the bitstream parameters comprise a video parameter set of a High Efficiency Video Coding standard.

* * * * *